(No Model.)
T. A. MYERS.
Combined Heater and Filter for Boilers.
No. 241,506. Patented May 17, 1881.
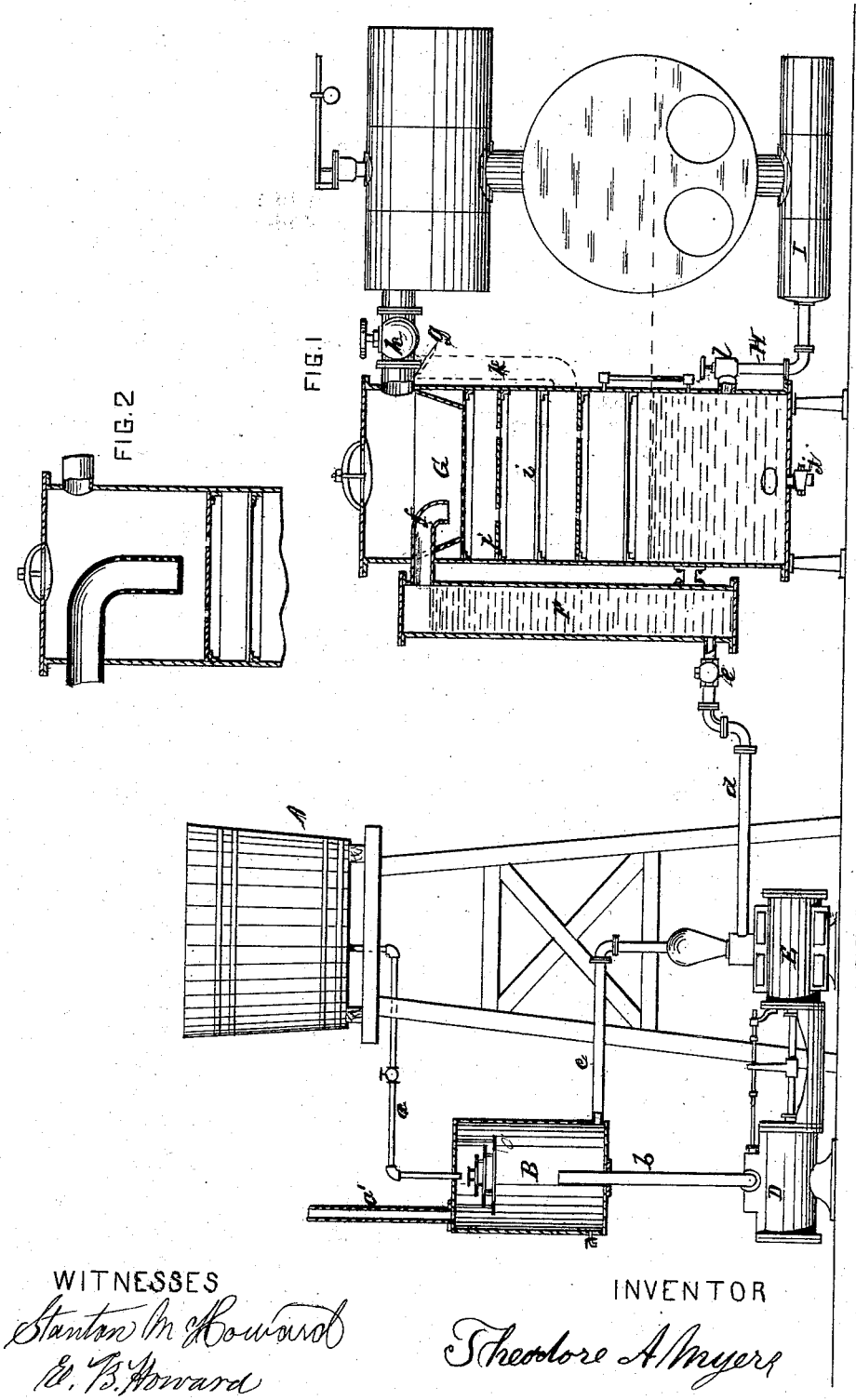
WITNESSES
Stanton M. Howard
E. B. Howard
INVENTOR
Theodore A. Myers

UNITED STATES PATENT OFFICE.

THEODORE A. MYERS, OF WHEELING, WEST VIRGINIA.

COMBINED HEATER AND FILTER FOR BOILERS.

SPECIFICATION forming part of Letters Patent No. 241,506, dated May 17, 1881.

Application filed March 3, 1881. (No model.)

*To all whom it may concern:*

Be it known that I, THEODORE A. MYERS, a citizen of the United States, residing at Wheeling, in the county of Ohio and State of West Virginia, have invented certain new and useful Improvements in a Combined Heater and Filter for Steam-Boilers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in devices for condensing the exhaust-steam of the engine to heat the water, and to extract the sediment therefrom, and to precipitate the soluble matter held in suspension.

The invention consists in the combination of certain contrivances by which the steam of the exhaust is made to meet showers or streams of water, in a measure condensing it, and then pumping this water into a stand-pipe, then submitting it to the action of the live steam in the boiler, in a vessel provided for that purpose, this vessel being supplied with shelves, pans, or other devices by which a complete dissemination of the water is effected, and by which admixture and commingling of the said steam and water, the calcareous and sedimentary matter held in suspension is caused to precipitate and deposit itself on the bottom of the said vessel. The water thus heated and cleansed flows into the boiler, the same pressure in the boiler being maintained in the vessel and stand-pipe. The boiler in this way is kept nearly free from calcareous deposits, and therefore from incrustation.

Referring to the accompanying drawings, Figure 1 represents a side elevation of my improved apparatus, the portion representing my invention being in section. Fig. 2 shows a vertical section of a modification of my filtering-vessel.

A shows the supply-tube; B, the vessel in which the exhaust-steam heats the water; $a$, the water-connecting pipe between the supply and heater; C, the water-spreader, arranged immediately over the exhaust-steam pipe $b$, and arranged in such manner that the shower of water is made to entirely surround the mouth of the exhaust-pipe, thus preventing the water in its descent from entering or falling into the exhaust-pipe. The shower of water falling from the spreader C (which is formed of a series of plates of varying diameters, the smallest being at the top) forms an annular sheet or thin film of water entirely encircling the volume of steam from the exhaust, forcing it to pass through said sheet, thus bringing it into intimate contact and compelling it to mingle with the water by which it is condensed.

D is the engine, which may be of any well-known form, and E the pump, which may be of any ordinary construction, they being simply intermediate elements in the operation of my plan of operation. $c$ is the pipe leading from the heater to the pump, and $d$ the pipe leading from the pump to the stand-pipe. $e$ is the check-valve, of any approved pattern, and F is the stand-pipe.

It may be observed that when water is above a certain temperature the pump fails to act, and if the water is not raised to a given temperature the subsidence of the calcareous matter will not take place as a deposit in the filtering-vessel, therefore to avoid and overcome the above-named two defects, is one of the principal objects of my invention. Hence it is that I pump the water from the heater before its temperature is raised too high to be pumped, and then give to it the additional heat after it passes through the check-valve and vessel or stand-pipe F.

G represents the filtering-vessel, into which the water from the stand-pipe flows through pipe $f$, and the live steam from the boiler through pipe $g$, pipe $g$ being provided with a stop-valve, $h$. This vessel G is provided with a series of shelves and pans of any ordinary construction. As before stated, the water, being partially heated, is pumped into the stand-pipe to near its top. It then passes into the vessel G and onto the pans and shelves $i\ i$ until it reaches the water-line, the level of which is about one-third the depth of the vessel. While the water is thus coursing down, the steam from the boiler fills the upper portion of the vessel and comes in contact with the water aforesaid and becomes thoroughly mixed with it, heating it to such a degree that the impalpable particles of sedimentary matter held in suspension therein are separated and caused to be deposited on the bottom of the vessel, from where they are blown off by the usual means, as seen at $j$. It may be observed, however, that some of the foreign matter is trapped on the pans and shelves, and may be removed through the ordinary man-hole.

If desired, the steam may be admitted through the pipe $k$, (shown in dotted lines.) When this method is adopted advantage is taken of the natural tendency of the elements for their better admixture—that is to say, when the steam is ascending, the water is descending, the volume of each being broken up by the pans and shelves, and in this way a complete mixing up of the steam and water is effected, thus fully accomplishing the object in view. The water being thus filtered and heated to the required temperature, it is automatically fed to the boiler through pipe H to the mud-drum I of the boiler, the water in the boiler and in the vessel G being at the same level and under the same pressure. Pipe H is provided with a stop-valve, $l$. The object of the valves $h$ and $l$ is to cut off communication with the boiler above and below, or either of them, when desired.

The usual appliances may be adopted, such as water-gages, gage-cocks, &c.

These vessels and heaters may be constructed of any suitable material, and of any capacity for which they may be required.

The boiler and reservoir may be of any well-known pattern, as my invention may be applied to any of the boilers in general use.

With my apparatus I am enabled to use the very muddy water of our rivers without subjecting the shell of the boiler to the great danger of incrustation and consequent explosion, as well as to overcome many other disadvantages, such as the prevention of the due quantity of heat being transmitted through the shell of the boiler to the water.

I am aware that heaters, filters, and condensers have been used for analogous purposes. I am also aware that pans and shelves have been used in heating and filtering vessels, and do not therefore claim such devices.

What I do claim, and desire to secure by Letters Patent, is—

1. The combination, in a combined heater and filter for steam-boilers, of the heater B and stand-pipe F and the filtering-vessel G, and their intervening mechanism, substantially as described, with the boiler arranged in the manner shown and set forth.

2. The combination, in a combined heater and filter, of the heater B provided with the water-spreader, the stand-pipe F and the filter G, having shelves and pans, arranged as shown, with their intervening mechanism, all arranged in the manner described, and for the purpose set forth.

3. The combination of the filter B, having the spreader C, with the stand-pipe F, the filtering-vessel G, having shelves and pans $i$, said vessel being connected to the top and bottom of the boiler, and the heater and stand-pipe being connected through the pump and pipe connections, in the manner shown and set forth.

4. The combination, in a combined heater and filter, of the heater B, supply-reservoir A, pump E, stand-pipe F, filter G, connecting-pipes $g$ and H, having stop-cocks $h$ and $l$ and blow-off $j$, all constructed and arranged to operate as set forth and described.

5. The combination, in a combined heater and filter, of the supply-tank A, heater B, spreader C, pipes $a$ $a'$ and $b$, with the steam-cylinder, pipe $c$ and pump E, with pipe $d$ and check-valve $e$, stand-pipe F, pipe $f$, and filter G, all arranged to operate as set forth and described.

In testimony whereof I affix my signature in presence of two witnesses.

THEODORE A. MYERS.

Witnesses:
STANTON M. HOWARD,
E. B. HOWARD.